United States Patent [19]

Clutter

[11] 4,436,319
[45] Mar. 13, 1984

[54] VEHICLE WHEEL SPLASH GUARD

[76] Inventor: James E. Clutter, 1703 Redbud Ct., Plainfield, Ind. 46168

[21] Appl. No.: 309,261

[22] Filed: Oct. 7, 1981

[51] Int. Cl.³ ............................................. B62D 25/16
[52] U.S. Cl. ............................................. 280/154.5 R
[58] Field of Search ................................. 280/154.5 R

[56] References Cited

U.S. PATENT DOCUMENTS

| | | | |
|---|---|---|---|
| 2,605,119 | 7/1952 | Earnest | 280/154.5 R |
| 3,006,658 | 10/1961 | Wenham et al. | 280/154.5 R |
| 3,341,222 | 9/1967 | Roberts | 280/154.5 R |
| 3,560,021 | 2/1971 | Watson | 280/154.5 R |
| 3,784,226 | 1/1974 | Wilfert et al. | 280/154.5 R |
| 3,834,732 | 9/1974 | Schons | 280/154.5 R |
| 4,192,522 | 3/1980 | Morgan | 280/154.5 R |
| 4,205,861 | 6/1980 | Roberts et al. | 280/154.5 R |

FOREIGN PATENT DOCUMENTS

| | | | |
|---|---|---|---|
| 2524344 | 9/1976 | Fed. Rep. of Germany | 280/154.5 R |
| 1526212 | 9/1978 | United Kingdom | 280/154.5 R |
| 1584453 | 2/1981 | United Kingdom | 280/154.5 R |

OTHER PUBLICATIONS

*Fleet Owner*, "Splash & Spray: Can We Control It?", Sep., 1979, pp. 67–73.

*Primary Examiner*—Joseph F. Peters, Jr.
*Attorney, Agent, or Firm*—Woodard, Weikart, Emhardt & Naughton

[57] ABSTRACT

A vehicle wheel splash guard for use on trucks, trailers, and other wheeled or tracked vehicles to reduce dangerous spray and splash. The splash guard is a double-wall construction having inner and outer walls which generally conform to the contour of a tire, covering the top and upper side portions thereof. Elongated apertures in the inner wall provide passages to the inside of the double-wall construction for water thrown off the tire. Said apertures extend in a direction transverse to that of the tire rotation on the top portion and in the direction of tire rotation on the side portions thereof. Baffles inside the double walls drain the water to locations under the vehicle and away from the paths of following tires. The splash guard is molded in one piece from lightweight plastic and may be formed to any shape desired or even inset with de-icing wires.

15 Claims, 18 Drawing Figures

VEHICLE WHEEL SPLASH GUARD

BACKGROUND OF THE INVENTION

This invention relates generally to splash guards for wheels of trucks, trailers and other wheeled and tracked vehicles, and more particularly to a double-wall lightweight molded plastic vehicle wheel splash guard for trucks, trailers and related vehicles such as motorcycles.

Traditional mud flaps are unable to contain or eliminate spray and splash which present hazards to passing and following motorists. Perhaps the most straightforward attempt to solve this problem involves enclosing the wheel in some type of cover, to reduce possible pathways for water, spray, or splash as they leave a tire. The device disclosed in U.S. Pat. No. 2,605,119 issued July 29, 1952 to M. L. Earnest attempts to do this by means of hinged front, back, and side walls. The hinges permit maintenance of the tire and wheel while the walls reduce splashing. However, this type of configuration is relatively expensive and complex due to the number of parts, hinges, etc.

The device shown in U.S. Pat. No. 3,784, 226 issued Jan. 8, 1974 to Wilfert et al. includes air-guide channels 6, for ventilation of the wheel brakes, in a contoured casing which encloses much of the tire. A water-collecting groove 4 along the lower inside edge of the casing returns water close to the road directly behind the tire. However, water may still ricochet or drip off the inside of the casing, tire, and wheel and back out under the sides of the casing.

Other devices have tried to solve the problem of splash and spray in other ways. The device disclosed in U.S. Pat. No. 4,205,861 issued June 3, 1980 to Roberts et al. uses no side panels and, on trailer wheels and tandem arrangements, does not even cover the top of each tire. Rather, the device is constructed in sections of arched shields located above some part of the upper half of a tire. A double-wall construction, with corrugations and apertures in the inner wall which both extend in the direction of tire curvature, is used to collect and drain water and spray under the vehicle away from the path of following tires. This arrangement does not substantially reduce side spray and splash.

U.S. Pat. No. 3,834,732 issued Sept. 10, 1974 to P. A. Schons discloses two embodiments of a device. The first is basically that described above for U.S. Pat. No. 4,205,861 but with circular apertures rather than slots. The second embodiment uses the same double wall construction but with a flat metallic inner wall having circular holes and flaps therein which form scoops facing the rear of the tire. Neither of these embodiments attempts to handle side spray and splash.

Other references of some interest but which are not as relevant as the art cited above are:

| U.S. Pat. No. | Patentee | Issue Date |
| --- | --- | --- |
| 4,192,522 | Morgan | 3/11/80 |
| 3,341,222 | Roberts | 9/12/67 | and Fleet Owner, "Splash & Spray: Can We Control It?", September, 1979, pp. 67-73.

SUMMARY OF THE INVENTION

Described briefly, in the present invention, a vehicle wheel splash guard for trucks, trailers, and other vehicles reduces dangerous spray and splash thrown off such vehicles in inclement weather. While the actual nature of the invention covered herein can be determined only with reference to the claims appended hereto, certain features which are characteristic of a typical embodiment of the novel splash guard disclosed herein can be described briefly.

In the preferred embodiment, a contoured double-wall construction covers the upper portion of a tire. The splash guards's inner wall has a top portion with side portions extending downward therefrom toward the axis of the tire on each side of said tire. The top portion has apertures extending crosswise while the side portions have apertures oriented in the direction of the junctions of said top and side portions. In the preferred embodiment flanges on the apertures assist in directing water from the tire through said apertures.

The outer wall in the preferred embodiment has no apertures, is spaced a short distance away from said inner wall, and generally conforms to the contour of the inner wall. Both walls are joined along the lower edges of the side portions. Water drains between the walls toward the ground and, in the preferred embodiment, is directed by baffles to exit the splash guard at locations away from the path of following tires.

In the preferred embodiment an aperture in the front face of the double-wall allows air to flow around the tires and brakes in order to reduce overheating.

Since a large portion of the tire is covered in the preferred embodiment, spray and splash from both the sides and the rear are reduced. In the preferred embodiment the guard is molded in one piece from plastic to save weight, cost, and fuel. One piece plastic construction also permits flexing to free ice and mud.

In other embodiments, it may be desirable to contour the splash guard to fit tandemly situated tires, to mold foot steps into the side portions of a guard for mounting below a truck cab, to insert de-icing wires in the plastic construction, or to construct the guard in arched sections to permit easier tire access and maintenance.

DESCRIPTION OF THE PREFERRED EMBODIMENTS

Figure 1:
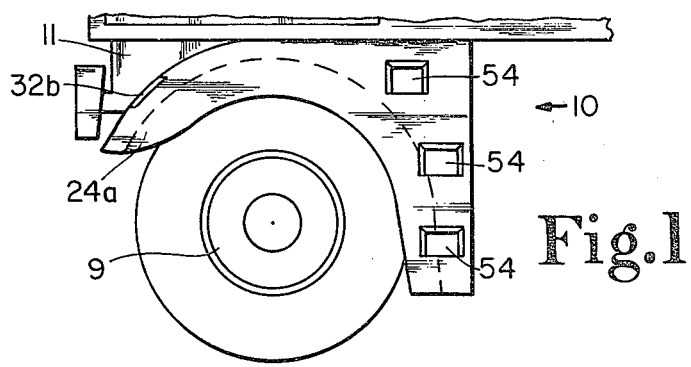
FIG. 1 is a side elevation view of a vehicle wheel splash guard for the front tire of a truck according to a typical embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to those skilled in the art to which the invention relates.

Referring now to the drawings in detail, in alternate embodiments the vehicle wheel splash guard is used as follows: guard 10 fits the front wheel 9 of a truck cab 11 as in FIG. 1; guard 10a fits a tandem wheel arrangement which has two or more pairs of tires 12 as in FIG. 2; guard 10b fits wheel 13 as in FIG. 3; guard 10c fits a vehicle bed-wheel arrangement where space is at a premium as in FIG. 12, or almost any other type of tire or track arrangement imaginable.

Figure 5A:
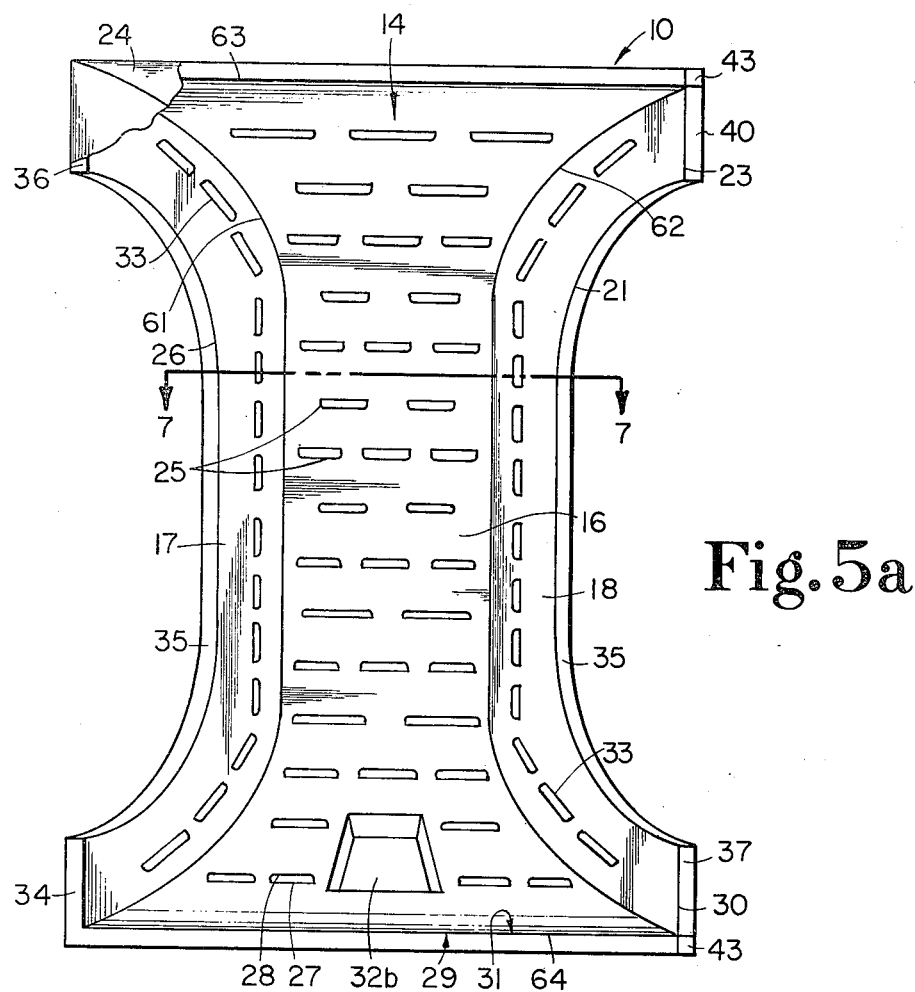
FIG. 5a is a bottom elevation view of a vehicle wheel splash guard showing the preferred arrangement of apertures.

Each such alternate embodiment, however, incorporates certain basic features. FIG. 5a shows the basic double-wall construction characteristic of each alternate embodiment. The inner wall 14 consists of an elongated top portion 16 having longitudinal edges 61 and 62 and transverse edges 63 and 64. Top portion 16 generally conforms to the contour of the outer surface of a tire and has side portions 17 and 18 but extending radially inward from longitudinal edges 61 and 62 toward the axis (not shown) of the tire which the particular splash guard is designed to enclose. One side portion is arranged adjacent to each side of the corresponding tire or pair of tires. The top portion 16 and side portions 17 and 18 are constructed so as to extend around the tire a distance selected for and depending upon the embodiment involved. For example, in the modification shown in FIG. 1, the tire is in front of the vehicle and guard 10 covers only about 180 degrees of the tire.

Since side portions 17 and 18 are mirror images in the preferred embodiment, only side portion 18 is described. Inner edge 21 is generally an arc of a circle and parallel to edge 62 of top portion 16 and side portion 18, and ends 23 and 30 are substantially parallel to the road surface (not shown) following installation. With other embodiments differently shaped edges are envisioned depending upon the specifics of the vehicle and the appearance preferred. For example, edge 21 and ends 23 and 30 might be a continuous smooth curve.

Outer wall 24 has substantially the same shape as inner wall 14 in the preferred embodiment. However, in certain applications, such as in FIGS. 1 and 2, it may be desirable to contour outer wall 24a or 24b, respectively, to fit specific vehicle designs or other specification requirements such as aerodynamic performance or specified strengths. Outer wall 24 (see FIGS. 3 and 5a) is positioned above inner wall 14 at a distance of about one inch except at edges 21 and 26 where inner wall 14 is joined to outer wall 24 by means of lips 35. In the preferred embodiment the joints at lips 35 are sealed to prevent substantial leakage of fluids out from between walls 14 and 24 at edges 21 and 26.

Figure 5B:
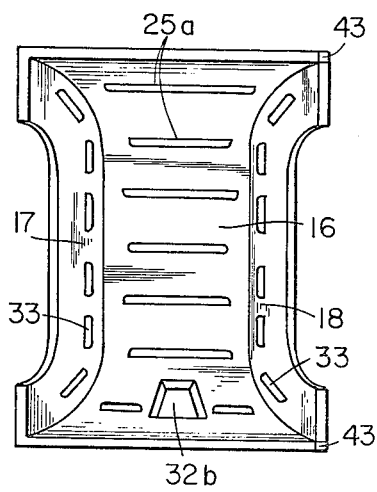
FIG. 5b is a bottom elevation view of a vehicle wheel splash guard showing a simple arrangement of apertures.
Figure 5C:
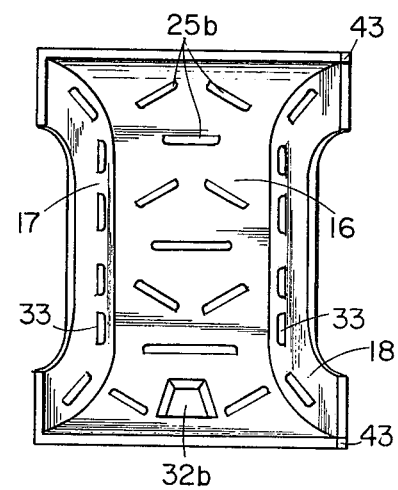
FIG. 5c is a bottom elevation view of a vehicle wheel splash guard showing an angled arrangement of apertures.

Top portion 16 has a series of first apertures 25 which, in the preferred embodiment, extend crosswise to the direction of rotation of the tire. The particular arrangement of the apertures may vary. FIG. 5a shows the preferred arrangement for one wheel where the number of apertures alternates between two and three apertures per row, and each row of apertures 25 is substantially parallel to the other rows. FIG. 5b shows one aperture per row with each aperture 25a extending nearly all the way across top portion 16. FIG. 5c shows an alternative arrangement of apertures 25b where some or all of the apertures have components of their direction vector in the longitudinal direction, i.e. the direction of rotation of the tire.

Figure 7:
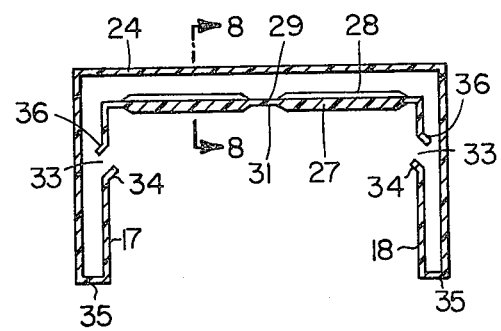
FIG. 7 is an end section view of a vehicle wheel splash guard looking along line 7—7 of FIG. 5a in the direction of the arrows and showing the double wall construction.
Figure 8:
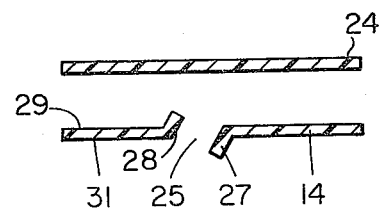
FIG. 8 is a section view looking along line 8—8 of FIG. 7 and showing the preferred flange orientation on the edge of an aperture in the top section of a vehicle wheel splash guard.

In the preferred embodiment, each aperture 25 has a pair of flanges as shown in FIGS. 7 and 8. Inner flange 27 is located on that transverse edge of each aperture 25 which is nearest the road surface following installation. If the aperture is located at the uppermost part of top portion 16, i.e. both edges are equidistant from the ground, no flange is desirable thereon. Flanges 27 are directed inward toward the tire and generally upward. With this orientation, each flange 27 acts as a scoop to direct water flowing down the inner wall 14, on that side 31 nearest the tire, through aperture 25. Outer flanges 28 are located on the edges of apertures 25 opposite flanges 27. Outer flanges 28 are directed outwards away from the tire and generally downwards. With this orientation flanges 28 prevent water, flowing down the outer surface 29 of top portion 14, from escaping from between walls 14 and 24 through apertures 25.

Figure 6A:
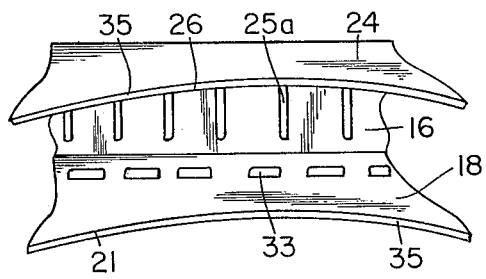
FIG. 6a is an elevation view of a vehicle wheel splash guard looking along line 6—6 of FIG. 4a in the direction of the arrows and showing the preferred arrangement of apertures on the side panels.
Figure 6B:
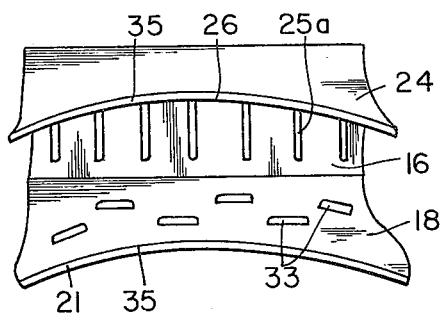
FIGS. 6b and 6c are elevation views of a vehicle wheel splash guard looking along line 6—6 of FIG. 4a in the direction of the arrows and showing alternative arrangements of apertures on the side panels.
Figure 6C:
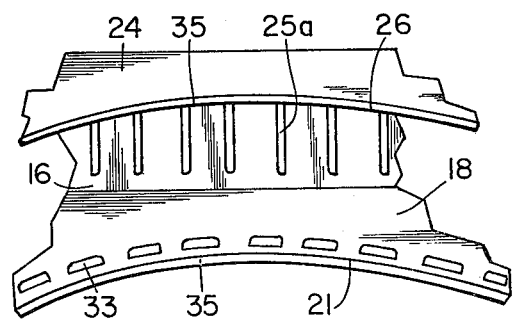

Apertures 33 are provided in side portions 17 and 18 in the preferred embodiment (see FIGS. 5a and 6a) and are oriented with their longitudinal axis in the direction of the junction where top portion 16 and side portions 17 and 18 meet, i.e. edges 61 and 62. In alternate embodiments, apertures 33 may be located near top portion 16 as in FIG. 6a, at any part of the side portions 17 and 18 as in FIG. 6b, or near edges 21 and 26 as seen in FIG. 6c.

In the preferred embodiment these apertures are also fitted with flanges. Inner and outer side flanges 34 and 36 (FIG. 7) are designed similar to inner and outer top flanges 27 and 28, respectively, except that side flanges 34 and 36 run along the longitudinal edges, i.e. edges running in the direction of tire rotation, of apertures 33. Thus in the preferred embodiment inner side flanges 34 are directed inward toward the tire and generally upward and are located on those edges of apertures 33 nearest the ground after installation. Outer side flanges 36 are directed outward from the tire and generally toward the road and are located on those edges of apertures 33 farthest from the road surface following installation.

Figure 4C:
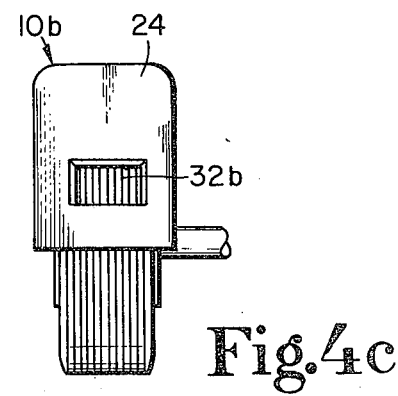
FIG. 4c is a front elevation view of a vehicle wheel splash guard mounted on a single tire and showing a single air inlet.
Figure 4A:
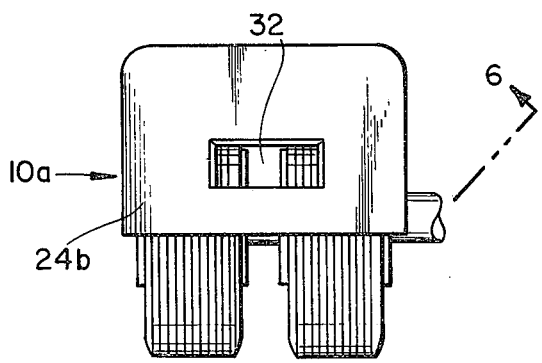
FIG. 4a is a front elevation view of a vehicle wheel splash guard mounted on one or more pairs of tires and showing a single air inlet.
Figure 4B:
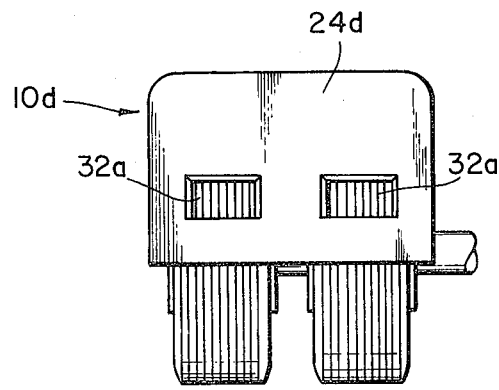
FIG. 4b is a front elevation view of a vehicle wheel splash guard mounted on one or more pairs of tires and showing a plurality of air inlets.

Air intake aperture 32 extends through walls 14 and 24, 24a or 24b in those sections which face the direction of vehicular travel. Air intake 32 provides a flow of air about the tire and brakes to prevent overheating. Accordingly, the number, location, and size of the air ducts will depend upon the particular application. The preferred embodiment shown in FIG. 4a has a single air intake 32 for a pair of tires. Other embodiments shown in FIGS. 4b and 4c use two intakes 32a for a pair of tires, therein defining outer wall 24d and guard 10d, and a single duct 32b for a single tire, respectively.

Figure 9:
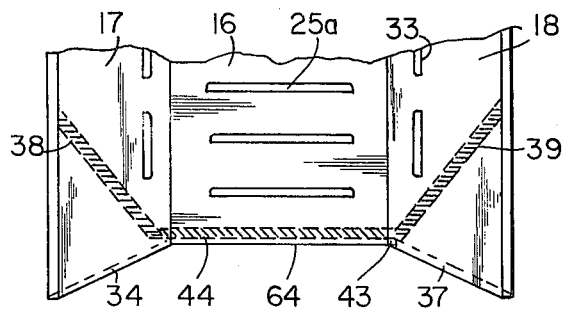
FIG. 9 is a section view of a vehicle wheel splash guard revealing a baffle design which diverts water out from between the double-walls at the desired location.

In the preferred embodiment, water is not allowed to drain from the ends 34, 36, 37, and 40 of side portions 17 and 18, in order to reduce spray and splash from the sides of the tires. Rather baffles 38 and 39 (see FIG. 9) drain water to the ends 63 and 64 of top portion 16. Water at ends 63 and 64 may be allowed to return to the roadbed or may be further directed, as in the preferred embodiment, to drainage locations on the inside corners 43 (those corners adjacent the inboard direction of the vehicle) of edges 63 and 64 by means of baffles 44.

Figure 2:
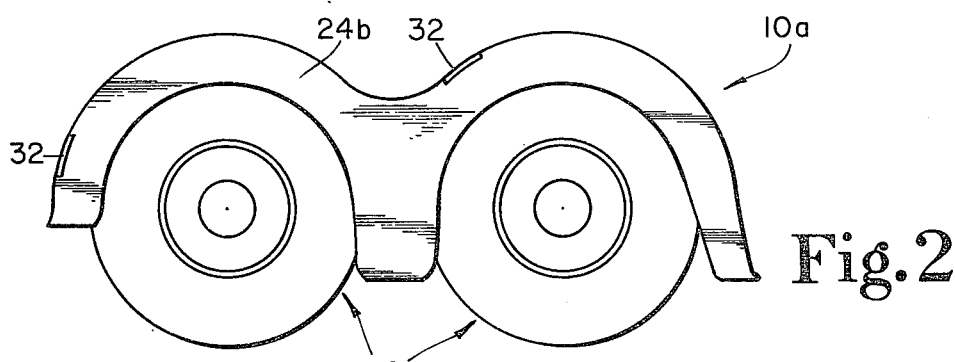
FIG. 2 is a side elevation view of a typical vehicle wheel splash guard for tandem sets of tires according to a typical embodiment of the present invention.
Figure 3:
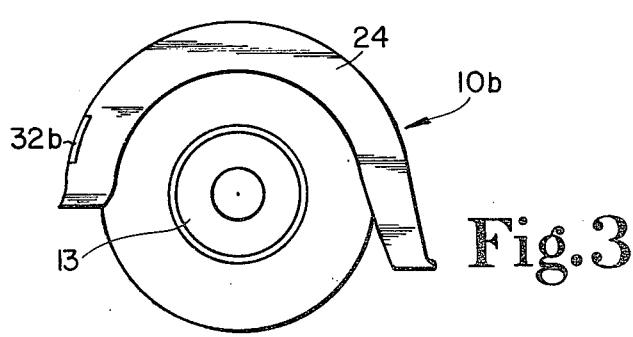
FIG. 3 is a side elevation view of a vehicle wheel splash guard for use with either a single tire or a pair of tires according to a typical embodiment of the present invention.
Figure 10:
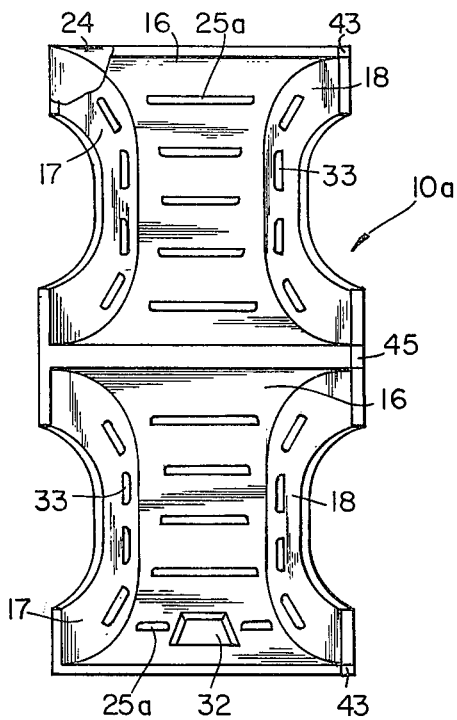
FIG. 10 is a bottom elevation view of a vehicle wheel splash guard for use in a tandem wheel application.

When the guard is applied to a tandem tire arrangement, as in FIG. 10, a pair of guards 10a are integrally joined at their outer walls 24 (also seen in FIG. 2). Accordingly, water is drained from between the two tires at corner 45 (as in FIG. 10) by means of baffles 38, 39, and 44 (shown in FIG. 9 only).

Figure 12:
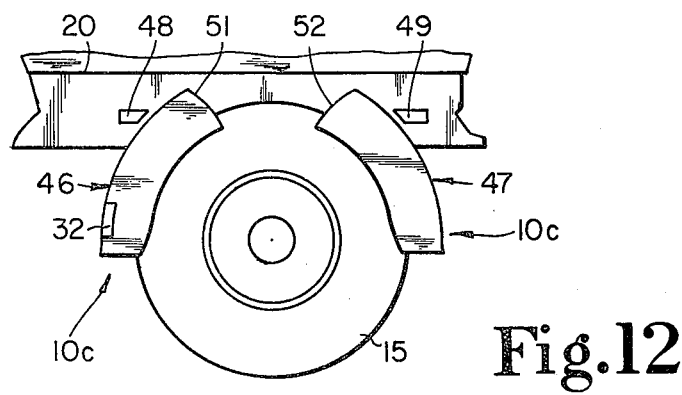
FIG. 12 is a side elevation view of an alternative vehicle wheel splash guard showing a sectioned construction for use where space is at a minimum.

FIG. 12 displays the sectioned construction used when there is a minimum of space between the top of tire 15 and the underside of the vehicle 20. In this situation the guard 10c consists of a front section 46 and a rear section 47 attached to the vehicle by means of supports 48 and 49 or any other suitable means. This construction is identical to that described above except that a top center section is cut away. The facing ends 51 and 52 of sections 46 and 47 may be either open or closed. If they are open, it is desirable to extend inner wall 14 beyond outer wall 24 to form a lip to catch water dripping from above and reduce the amount of water returning to tire 15.

In the preferred embodiment, guard 10, 10a, 10b, etc. is molded in one piece from lightweight plastic. This construction permits flexing of the guard to help free any ice, mud, or other debris collected therein. Also, being of plastic, the guard is inexpensive and light of weight, thus providing a savings in fuel costs.

Figure 11:
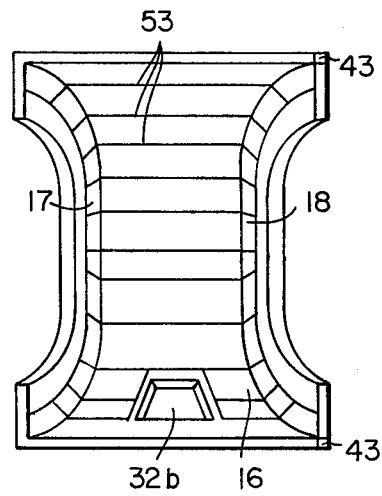
FIG. 11 is a bottom elevation view of a vehicle wheel splash guard depicting one arrangement of de-icing wires.

Additionally, de-icing wires 53 may be molded directly into the plastic during construction, providing a second method of removing ice. FIG. 11 displays one possible arrangement of wires 53. Also, footsteps 54, which permit easier access to the cab of a vehicle (see FIG. 1), or other accessories, may be easily molded into the plastic splash guard during construction.

Clearly, a large number of cosmetic changes may be made to adapt the splash guard to a particular vehicle and a particular use without changing the basic double-wall and aperture design. Therefore, while the invention has been illustrated and described in detail in the drawings and foregoing description, the same is to be considered illustrative and not restrictive in character, it being understood that the preferred embodiment has been shown and described and that all changes and modifications that come within the spirit of the invention are desired to be protected.

What is claimed is:

1. A vehicle wheel splash guard for mounting to wheeled vehicles so as to partially enclose or cover the tires of such vehicles, said splash guard comprising:
   (a) an inner wall having:
      (1) an elongated top portion having longitudinal and transverse edges aligned with and above a corresponding vehicle tire when mounted to a corresponding vehicle;
      (2) a pair of side portions extending radially inward from the longitudinal edges of said top portion toward the axis of said tire, one side portion adjacent to each side of said tire;
      (3) a plurality of first apertures in said top portion which extend generally parallel to the axis of said tire; and
      (4) a plurality of second apertures in said side portions running in generally the same direction as the junctions of said top and side portions; and
   (b) an outer wall located on the opposite side of said inner wall from said tire and cooperatively arranged to reduce splash and spray from said tire, said outer wall being joined to said inner wall at the radially inward edges of said side portions, said jointed location being sealed to substantially prevent leakage of fluids therethrough.

2. The splash guard of claim 1 wherein:
said first and second apertures have first flanges on that edge of each aperture nearest the ground when said guard is mounted on the vehicle, said flanges extending inward toward said tire and away from the ground to direct materials moving from said tire through said apertures.

3. The splash guard of claim 2 wherein:
said top portion has a curved generally rectangular shape and its curvature generally matches that of said tire.

4. The splash guard of claim 1 wherein:
(a) said inner and outer walls are contoured to cover the upper portions of a pair of tandemly arranged tires, said inner wall being depressed between said tires to maintain a nearly constant distance therefrom and forming the shape of a pair of inverted U's;
(b) said outer wall diverging from said inner wall where said inner wall is depressed, forming only a shallow depression between said tandemly arranged tires and providing improved structural integrity; and
(c) a first means for draining liquids flowing into the depressed portions of said inner and outer walls between said tandem tires from said splash guard.

5. The splash guard of claim 4 and further comprising:
second means for draining liquids flowing between said inner and outer walls out of said splash guard at those locations directly below the two transverse ends of said top portion.

6. The splash guard of claim 5 wherein:

said first and second draining means direct liquids out from between said inner and outer walls at locations adjacent the inboard direction of the vehicle, to reduce the amount of liquids returned to tire paths.

7. The splash guard of claim 1 and further comprising:
an air intake aperture extending through said inner and outer walls and located on that portion of said splash guard facing the direction of vehicle travel to allow air access to said tire.

8. The splash guard of claim 1 wherein:
said splash guard covers about 220 degrees of said tire, said covered portion being the top 220 degrees of said tire about equally apportioned between the front and back portions of said tire.

9. The splash guard of claim 1 wherein:
(a) the front portion of said splash guard, that is, that portion which faces the direction of vehicle travel, extends only a short way down the front of said tire, reducing weight which is not needed to prevent splash; and
(b) the rear portion of said splash guard extends downward close to the ground.

10. The splash guard of claim 9 and further comprising:
a plurality of foot steps integral with said outer wall to allow a person to mount said splash guard to reach the cab of said vehicle.

11. The splash guard of claim 1 wherein:
said splash guard unit is molded in one piece from lightweight plastic.

12. The splash guard of claim 11 wherein:
said molded plastic splash guard unit is pre-formed with inset de-icing wires to prevent clogging and freezing.

13. The splash guard of claim 1 wherein:
said splash guard has an upper portion of said inner and outer walls cut away to form a multi-sectioned construction appropriate for use where the top of a tire is close to the underside of a vehicle.

14. The splash guard of claim 13 wherein:
said multi-sectioned splash guard is molded in two or three unitary pieces of lightweight plastic, respectively.

15. The splash guard of claim 14 wherein:
said molded plastic splash guard is pre-formed with inset de-icing wires to prevent clogging and freezing.

* * * * *